(12) United States Patent
Kikuchi

(10) Patent No.: US 6,398,110 B1
(45) Date of Patent: Jun. 4, 2002

(54) METHOD OF PROVIDING SERVICES FOR USERS AND A SERVICE PROCESSING SYSTEM FOR THE SAME

(75) Inventor: Yoshinori Kikuchi, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/716,255

(22) Filed: Nov. 21, 2000

Related U.S. Application Data (63) Continuation of application No. 09/174,444, filed on Oct. 19, 1998, now abandoned.

(30) Foreign Application Priority Data

Oct. 21, 1997 (JP) .............................................. 9-288148

(51) Int. Cl.⁷ .............................................. G07B 15/02
(52) U.S. Cl. ..................................... 235/384; 705/417
(58) Field of Search .................................. 235/384, 382, 235/492, 378, 380, 381; 705/14, 16, 17, 34, 417

(56) References Cited

U.S. PATENT DOCUMENTS

| | | | |
|---|---|---|---|
| 2,907,521 A | 10/1959 | Cunningham | 346/40 |
| 3,356,021 A | 12/1967 | May | 101/93.34 |
| 3,609,300 A | 9/1971 | Halpern | 235/384 |
| 3,870,866 A | 3/1975 | Halpern | 235/378 |
| 4,908,499 A | 3/1990 | Guion | 235/380 |
| 4,935,962 A | 6/1990 | Austin | 235/380 |
| 4,963,723 A | 10/1990 | Masada | 235/384 |
| 4,977,501 A | 12/1990 | Lefevre | 364/401 |
| 5,103,392 A | 4/1992 | Mori | 395/725 |
| 5,440,109 A | 8/1995 | Hering et al. | 235/384 |
| 5,498,860 A | 3/1996 | Ohno et al. | 235/384 |
| 5,544,040 A | 8/1996 | Gerbaulet | 705/26 |
| 5,578,808 A | 11/1996 | Taylor | 235/384 |
| 5,581,249 A | 12/1996 | Yoshida | 235/384 |
| 5,649,118 A * | 7/1997 | Carlisle et al. | 395/241 |
| 5,783,809 A | 7/1998 | Niino et al. | 235/380 |
| 5,901,303 A | 5/1999 | Chew | 235/492 X |
| 5,920,057 A | 7/1999 | Sonderegger et al. | 235/384 |
| 5,992,738 A | 11/1999 | Matsumoto et al. | 235/381 |
| 6,019,285 A * | 2/2000 | Isobe et al. | 235/384 |
| 6,088,680 A * | 7/2000 | Hoshino et al. | 705/13 |

FOREIGN PATENT DOCUMENTS

| | | | |
|---|---|---|---|
| EP | 0 345 980 A2 * | 12/1989 | |
| EP | 0596579 | 5/1994 | |

(List continued on next page.)

*Primary Examiner*—Michael G. Lee
*Assistant Examiner*—Diane I. Lee
(74) *Attorney, Agent, or Firm*—Mattingly, Stanger & Malur, P.C.

(57) ABSTRACT

A service processing system includes an IC card possessed by a passenger and at least one automatic ticket inspection machine installed in each station of a traffic facility. The card includes a storage for keeping therein a stored value assigned as an equivalent for utilization of a service and service points supplied in association with a utilization state of services and an interface unit to achieve data communication with an external device. The machine includes a reader/writer to communicate data with the IC card. The machine transfers, when the passenger enters a platform through the machine of the station for the traffic facility, entrance information related to the station to the IC card. The IC card keeps the entrance information and transfers, when the passenger leaves a platform via the machine of a destination station, the entrance information to the machine. In accordance with the entrance information, the machine creates exit information representing a state of utilization of the traffic facility and sends the exit information to the IC card. On receiving the exit information, the IC card calculates service points in accordance with the received exit information and the utilization state.

10 Claims, 7 Drawing Sheets

FOREIGN PATENT DOCUMENTS

| | | | |
|---|---|---|---|
| EP | 0762341 | | 3/1997 |
| GB | 2246896 | | 2/1992 |
| GB | 2267626 | * | 8/1993 |
| JP | 02-304692 | * | 12/1990 |
| JP | 3-257598 | | 11/1991 |
| JP | 5-324998 | | 12/1993 |
| JP | 6-266970 | | 9/1994 |
| JP | 7-65243 | | 3/1995 |
| JP | 7-320156 | | 12/1995 |
| JP | 8-185550 | | 7/1996 |
| JP | 10-255086 | * | 9/1998 |
| WO | 9500928 | | 1/1995 |

* cited by examiner

| PERSONAL INFORMATION | | ~610 |
|---|---|---|
| NAME | KIKUCHI | |
| ADDRESS | ..., YOKOHAMA | |
| DATE OF BIRTH | 1990. 3. 5 | |
| TELEPHONE NO. | 045-123-4567 | |
| OCCUPATION | PUPIL OF ELEMENTARY SCHOOL | |
| SUBSCRIPTION DATE | 1996. 4. 1 | |
| DATE OF ISSUANCE | 1997. 2. 1 | |
| NEAREST STATION 1 | KAWASAKI | |
| NEAREST STATION 2 | YOKOHAMA | |
| . | | |

| ENTRANCE INFORMATION | | ~601 |
|---|---|---|
| ENTRANCE DATE | 1997. 3. 1 | |
| ENTRANCE TIME | 12 : 30 | |
| ENTRANCE STATION NAME | YOKOHAMA | |
| . | | |
| . | | |

| STORED VALUE BALANCE | 2350 | ~602 |
| ACCUMULATED VALUE OF SERVICE POINTS | 20 | ~603 |

| | ACCUMULATED DISTANCE TRAVELED (1101) | ACCUMULATED FARE (1102) | NO. OF TRAVELS (1103) | OTHERS |
|---|---|---|---|---|
| ACCUMULATION OF CURRENT MONTH | 55 | 5, 620 | 8 | |
| ACCUMULATION OF LAST MONTH | 310 | 13, 260 | 25 | |
| ACCUMULATION OF SECOND LAST MONTH | 270 | 10, 230 | 32 | |
| : | : | : | : | |
| : | : | : | : | |

| ENTRANCE INFORMATION | | ~501 |
|---|---|---|
| ENTRANCE DATE | H9. 3. 1 | ~502 |
| ENTRANCE TIME | 12 : 30 | ~503 |
| ENTRANCE STATION | YOKOHAMA | ~504 |
| . | | |
| . | | |

FIG. 9

| EXIT INFORMATION | | ~903 |
|---|---|---|
| ENTRANCE DATE | 1997. 3. 1 | |
| ENTRANCE TIME | 12 : 30 | |
| ENTRANCE STATION NAME | YOKOHAMA | |
| EXIT TIME | 13 : 05 | |
| EXIT STATION NAME | KAWASAKI | |
| FARE | 180 | ~901 |
| DISTANCE TRAVELED | 20 | ~902 |
| . | | |

| HISTORICAL INFORMATION | |
|---|---|
| ENTRANCE DATE | 1997. 2. 15 |
| ENTRANCE TIME | 11 : 15 |
| ENTRANCE STATION NAME | YOKOHAMA |
| EXIT TIME | 12 : 45 |
| EXIT STATION NAME | SHINAGAWA |
| FARE | 350 |
| DISTANCE TRAVELED | 10. 5 |
| · | |
| ENTRANCE DATE | 1997. 3. 1 |
| ENTRANCE TIME | 12 : 30 |
| ENTRANCE STATION NAME | YOKOHAMA |
| EXIT TIME | 13 : 05 |
| EXIT STATION NAME | KAWASAKI |
| FARE | 180 |
| DISTANCE TRAVELED | 10. 5 |
| · | |
| ENTRANCE DATE | |
| ENTRANCE TIME | |
| ENTRANCE STATION NAME | |
| EXIT TIME | |
| EXIT STATION NAME | |
| FARE | |
| DISTANCE TRAVELED | |
| · | |

| PERTINENT STATION NAME | TOKYO | SHINBASHI | SHINAGAWA | YOKOHAMA | .. | .. |
|---|---|---|---|---|---|---|
| KAWASAKI | 200 | 180 | 120 | 180 | .. | .. |

FIG. 13

| PERTINENT STATION NAME | TOKYO | SHINBASHI | SHINAGAWA | YOKOHAMA | .. | .. |
|---|---|---|---|---|---|---|
| KAWASAKI | 30 | 25 | 12 | 20 | .. | .. |

# METHOD OF PROVIDING SERVICES FOR USERS AND A SERVICE PROCESSING SYSTEM FOR THE SAME

This is a continuation application of U.S. Ser. No. 09/174,444, filed Oct. 19, 1998, now abandoned.

BACKGROUND OF THE INVENTION

The present invention relates to a method of providing services for customers and users, and in particular, to a service processing system for use with a traffic facility such as a railway transportation or facility in which a point service is carried out in accordance with a state of utilization of each user.

Heretofore, there has been known a customer service called a "point service", in which points are assigned to each customer in accordance with such transaction data as an amount of transaction, in a transaction processing in a shop or a store, such that when the accumulated number of points of the customer becomes equal to a predetermined number of points (target number of points), an article or a merchandise coupon is given to the customer. JP-A-5-324998, JP-A-6-266970, JP-A-7-65243, etc. describe technologies related to the point service of this kind.

In these service processing systems above, service points are calculated in accordance with the utilization state of each customer by a host system or a high-order system of a point of sales (POS) system or the like, and the calculated result is recorded in an IC card issued to the customer in advance. Moreover, when changing a rate of addition of service points for each customer, the host system or the high-order system refers to data of the rate of addition beforehand stored for the customer so as to appropriately calculate the service points in accordance with the rate.

SUMMARY OF THE INVENTION

In accordance with the prior art, the service points are calculated by the host system or the high-order system such as the POS system. Consequently, the service points are fixedly set to a table arranged in the high-order system. When it is desired to provide more precise satisfactory services, for example, when the service points are to be changed in accordance with the utilization state of each customer, it is required for the host system to manage the utilization state of each customer in a concentrated fashion for the calculation of service points in accordance with the utilization state. In consequence, it is necessary for the host system to execute transaction processing for any transaction, which leads to a problem that the load imposed on the host system becomes heavier and hence the processing response time is elongated. On the other hand, in a case in which such a point service is to be introduced to a passenger traffic facility such as a railway transportation, there may be executed processing to calculate points when a passenger enters or leaves a platform of a station through an automatic ticket inspection machine installed at a wicket of the station. Since a high processing speed is required in this case, the conventional technology described above cannot be applied to the system.

It is therefore an object of the present invention, which is devised to solve the problems of the prior art, to supply each customer with service points in a more precise manner in accordance with the utilization state of the customer, and to supply service points to the customer with a high degree of freedom in various fashions in accordance with information of the customer.

To achieve the object above, there is provided a service processing system in accordance with the present invention including an IC card possessed by a user or passenger, and an automatic ticket inspection machine arranged in each station of the pertinent transportation facility. The IC card includes storage means for keeping therein a stored value supplied as an equivalent for utilization of a service and service points supplied in association with a service utilization state, and interface means for conducting data communication with an external device. The automatic ticket inspection machine includes a reader/writer for accomplishing data communication with the IC card, means for transferring, when the passenger enters a platform of a station through the machine to access the transportation facility, entrance information related to the starting station to the IC card, and means for receiving, when the passenger leaves a platform of a station through the machine, the entrance information from the IC card, creating exit information representing a utilization state of the facility in accordance with the entrance information, and transferring the exit information to the IC card. Additionally, the IC card includes means for receiving and keeping therein the entrance information, and means for calculating service points in accordance with a utilization state associated with the received exit information.

BRIEF DESCRIPTION OF THE DRAWINGS

The objects and features of the present invention will become more apparent from the consideration of the following detailed description taken in conjunction with the accompanying drawings in which.

DESCRIPTION OF THE PREFERRED EMBODIMENT

Figure 1:
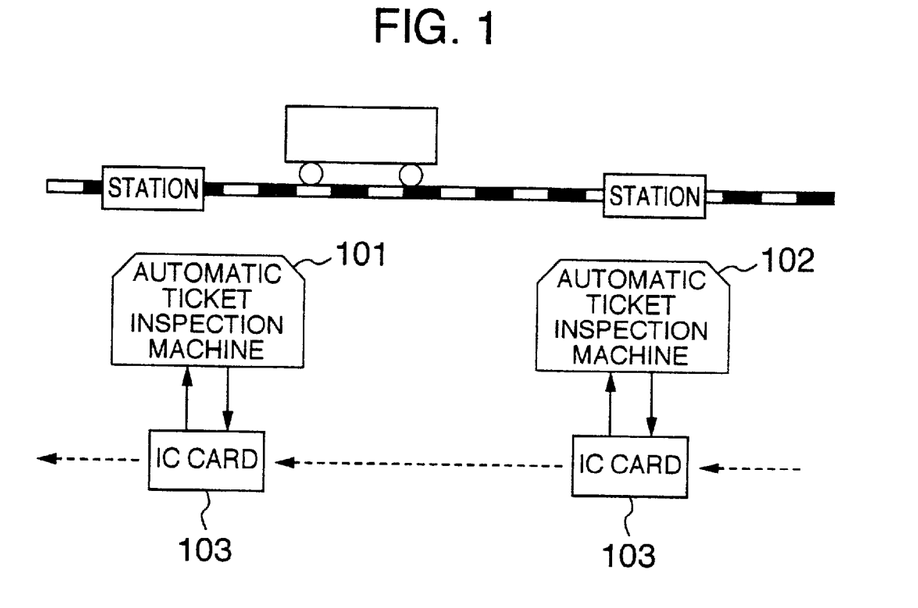
FIG. 1 is a configuration diagram of an embodiment of a system in accordance with the present invention.

FIG. 1 shows, in a configuration diagram, an embodiment of a point service processing system related to a railway fare in accordance with the present invention. In the diagram, 101 and 102 denote automatic ticket inspection machines installed at a wicket of each station to communicate data with an IC card 103 via an input/output section thereof. The IC card 103 is used by a passenger. In this embodiment, the IC card 103 is a non-contact IC card for which the IC card/read writer can conduct read and write operations without any physical contact therewith. When entering or leaving a platform of a station through the ticket inspection machine 101, 102, the passenger holds the IC card 103 to pass it over the input/output section of the machine 101, 102. The IC card 103 is used to manage customer information of the holder of the card, utilization of trains, history of travels, a balance of stored value, service points, etc. The machine 101, 102 communicates information with the IC card 103 to carry out processing such as management and control of passages of travelers as well as calculation of the fare.

Figure 2:
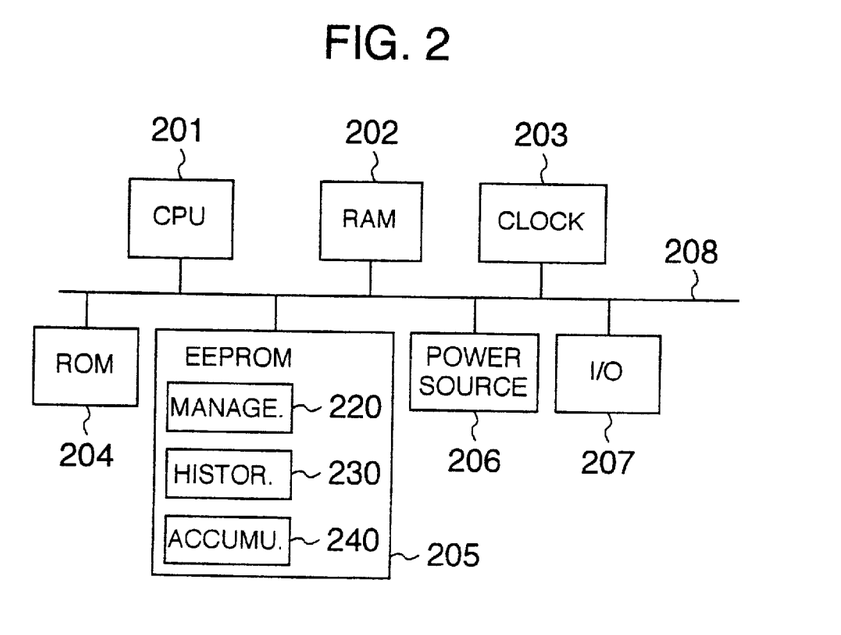
FIG. 2 is a block diagram showing an internal structure of an IC card.

FIG. 2 shows in a block diagram an internal structure of the IC card 103. In the diagram, 201 denotes a central processing unit (CPU) to conduct fundamental processing, control, and storing operations as a computer. Numeral 202 indicates a random access memory to be accessed by the CPU 201 for its processing. Numeral 203 is a clock (CLOCK) section to supply a clock signal necessary for operation of each section of the IC card 103. Numeral 204 designates a read-only memory (ROM) in which such programs to operate the IC card as an operating system and application programs to implement the point service of the embodiment are written. In this embodiment, various functions of the IC card 103 are achieved when the CPU 201 executes programs read from the ROM 204. Numeral 205 is an electrically erasable programmable ROM (EEPROM) including a nonvolatile memory that has a management information table 220 in which information such as personal information is recorded, a historical information table 230 to store therein a history of utilization, and an accumulated information table 240 in which accumulated information of utilization state is recorded. Numeral 206 is a power source to supply power necessary for operations of respective sections of the IC card 103. Numeral 207 indicates an input/output control section (I/O) to conduct data communication with the IC card reader/writer. These constituent elements are connected via a bus 208 to each other.

Figure 3:
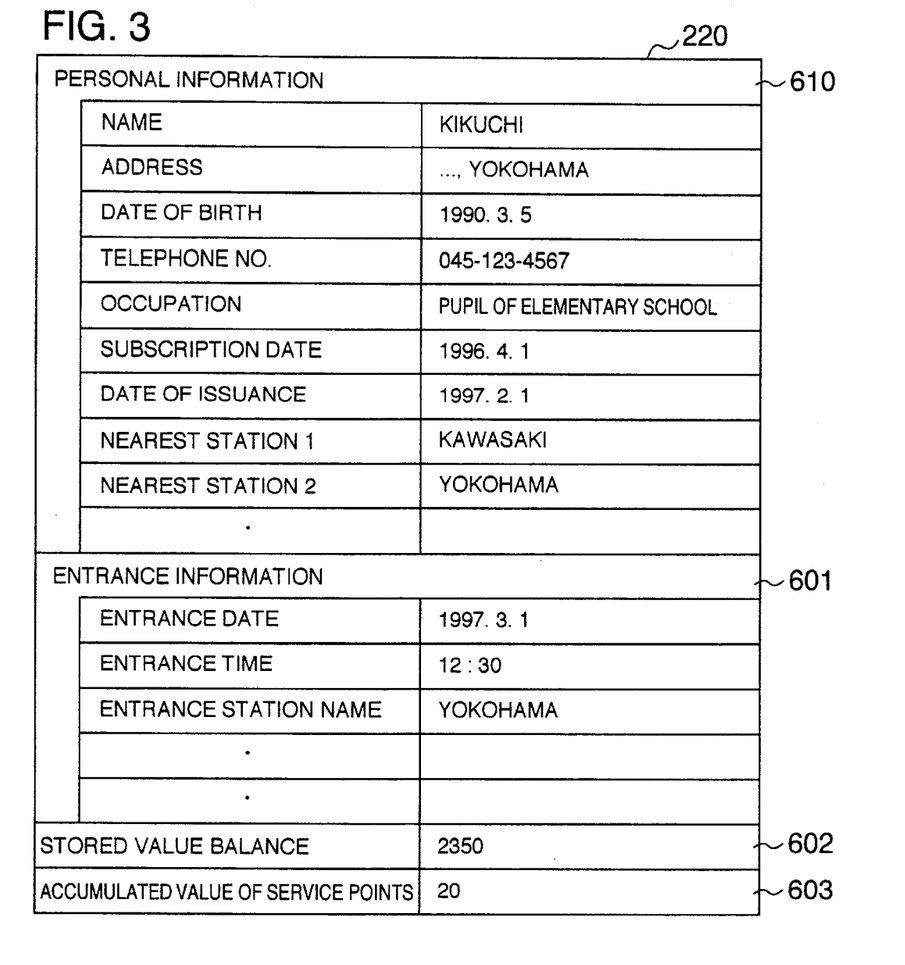
FIG. 3 is a diagram showing an example of a table layout of a management information table.

FIG. 3 shows, in a table layout diagram, an example of the management information table in the EEPROM 205. The management information table 220 includes a personal information record area 610 to which a name, an address, and the like of a passenger having the IC card 103 are registered, an entrance information registration area 601 to which entrance information is registered when the passenger passes through the ticket inspection machine by use of the IC card 103, a stored value balance record area 602 in which a value balance kept by the IC card 103 is recorded, and a service point accumulated value area 603 in which an accumulated value of service points is recorded.

Figure 4:
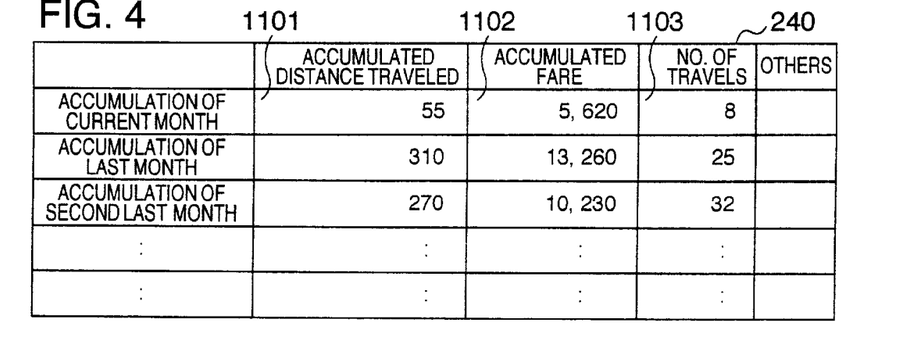
FIG. 4 is a diagram showing an example of an accumulated information table.

FIG. 4 shows in a configuration diagram an example of the accumulated information table. As can be seen from the diagram, the accumulated information table 240 includes an accumulated distance field 1101 indicating a traveled distance accumulated for each month, an accumulated fare field 1102 denoting an accumulated fare for each month, and an accumulated travel count field 1103 representing an accumulated value of travels for each month.

Figure 5:
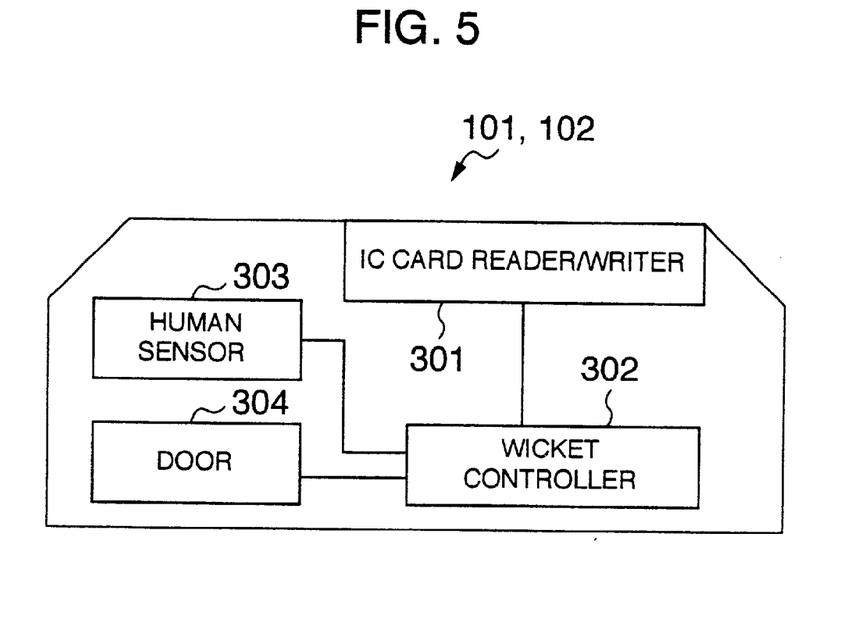
FIG. 5 is a block diagram showing an internal configuration of an automatic ticket inspection machine.

FIG. 5 shows, in a block diagram, an internal constitution of the automatic ticket inspection machine 101, 102. Numeral 301 indicates an IC card reader/writer to communicate data with the IC card 103. Numeral 302 stands for a ticket inspection controller which calculates the fare and the traveled distance and which controls the machine 101, 102. Numeral 303 is a human sensor to detect a human passing through the machine 101, 102. Numeral 304 is door installed in the machine 101, 102 to be closed, when an incorrect passage is detected, so as to hinder the passenger to pass through the machine 101, 102.

Figure 6:
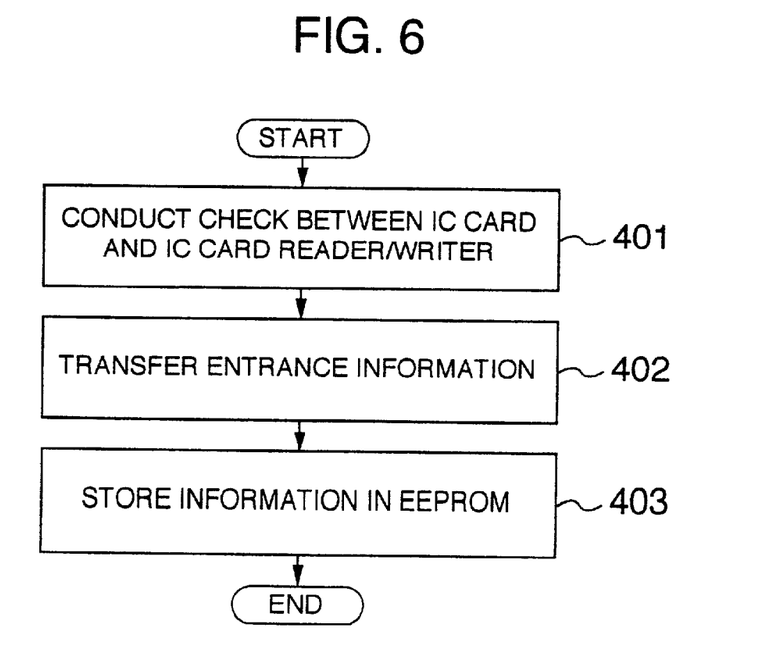
FIG. 6 is a flowchart showing a procedure of processing executed between the IC card and the ticket inspection machine when a passenger enters a platform through the machine.
Figure 7:
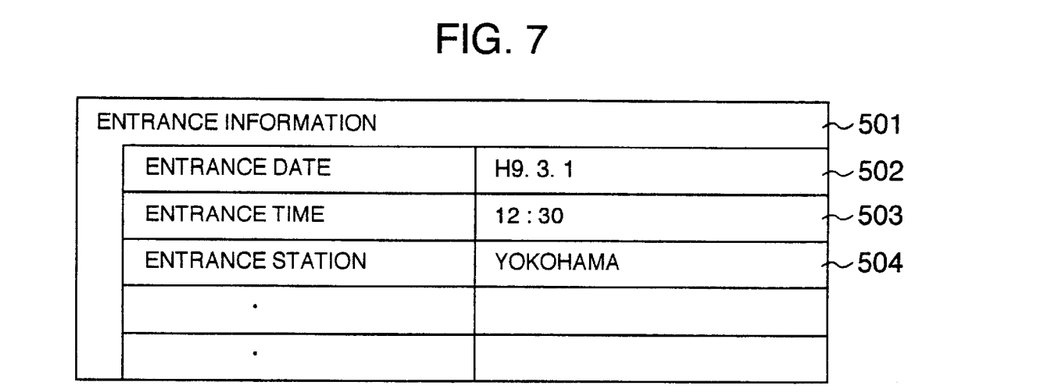
FIG. 7 is a diagram for explaining entrance information which the IC card receives from the IC card reader/writer.

FIG. 6 is a flowchart of processing to be executed when the passenger enters a platform of a station through the ticket inspection machine 101, 102 in which the passenger holds the IC card 103 to pass it over the IC card reader 301 of the machine 101, 102. Referring now to the flowchart of FIG. 6, description will now be given of a processing procedure conducted when the passenger enters the platform through the machine 101, 102. When the IC card is placed over the reader/writer 301, communication is established between the reader/writer 301 and the IC card 103, and then a check is conducted therebetween (step 401). When the check is finished, the controller 302 of the machine 101, 102 creates entrance information and sends the information via the reader/writer 301 to the IC card 103 (step 402). FIG. 7 shows an example of the entrance information transferred from the machine 101, 102 to the IC card 103. As shown in FIG. 7, the entrance information 501 includes entry fields such as an entrance date field 502 indicating a date on which the passenger enter the platform of the station through the machine 101, 102, an entrance time field 503 denoting a point of time of entrance, and an entrance station name field 504 indicating a station in which the machine 101, 102 is installed. The entrance information sent from the machine 101, 102 is stored in the entrance information registration area 601 of the management information table 220 (step 403).

Figure 8:
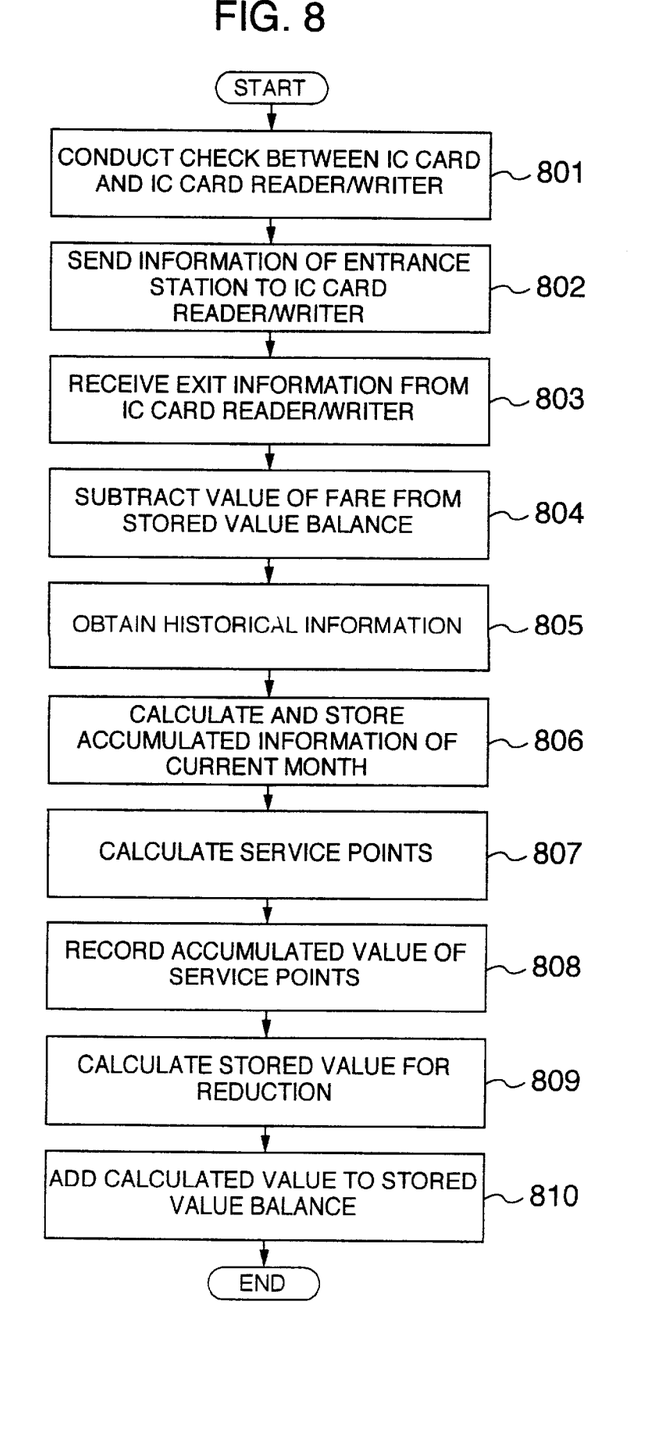
FIG. 8 is a flowchart showing a procedure of the IC card when a passenger leaves a platform through the ticket inspection machine.

When the passenger leaves the platform through the machine 101, 102, the passenger similarly holds the IC card 103 to pass it over the reader/writer 301 as in the case in which the passenger enters the platform. FIG. 8 is a flowchart showing a processing procedure executed in the IC card 103 in this situation. When the passenger places the IC card 103 over the reader/writer 301 for the passage through the machine 101, 102, communication is established between the reader/writer 301 and the IC card 103, and then a check is conducted therebetween (step 801). When the communication is established and the check is finished therebetween, entrance information is read from the entrance information registration area 601 of the management information table 220. The obtained information is transmitted from the I/O controller 207 to the reader/writer 301 of the machine 101, 102. The data transmitted in this operation is substantially the same as that shown in FIG. 6 (step 802). Next, the IC card 103 receives exit information sent from the reader/writer 301.

Figure 9:
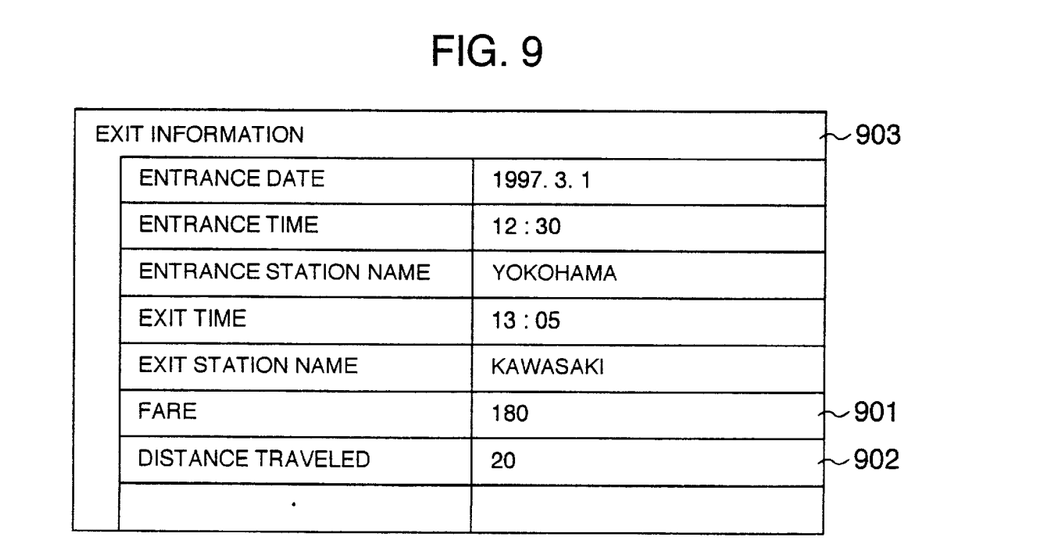
FIG. 9 is a diagram for explaining exit information which the IC card receives from the IC card reader/writer when a passenger leaves a platform through the machine.

FIG. 9 is a diagram for explaining an example of the exit information. As can be seen from this diagram, the exit information 903 includes information items such as a date of entrance, a time thereof, a station name thereof, a time of exit, a station name thereof, a fare of section traveled 901, and a distance traveled 902 (step 803).

Figure 10:
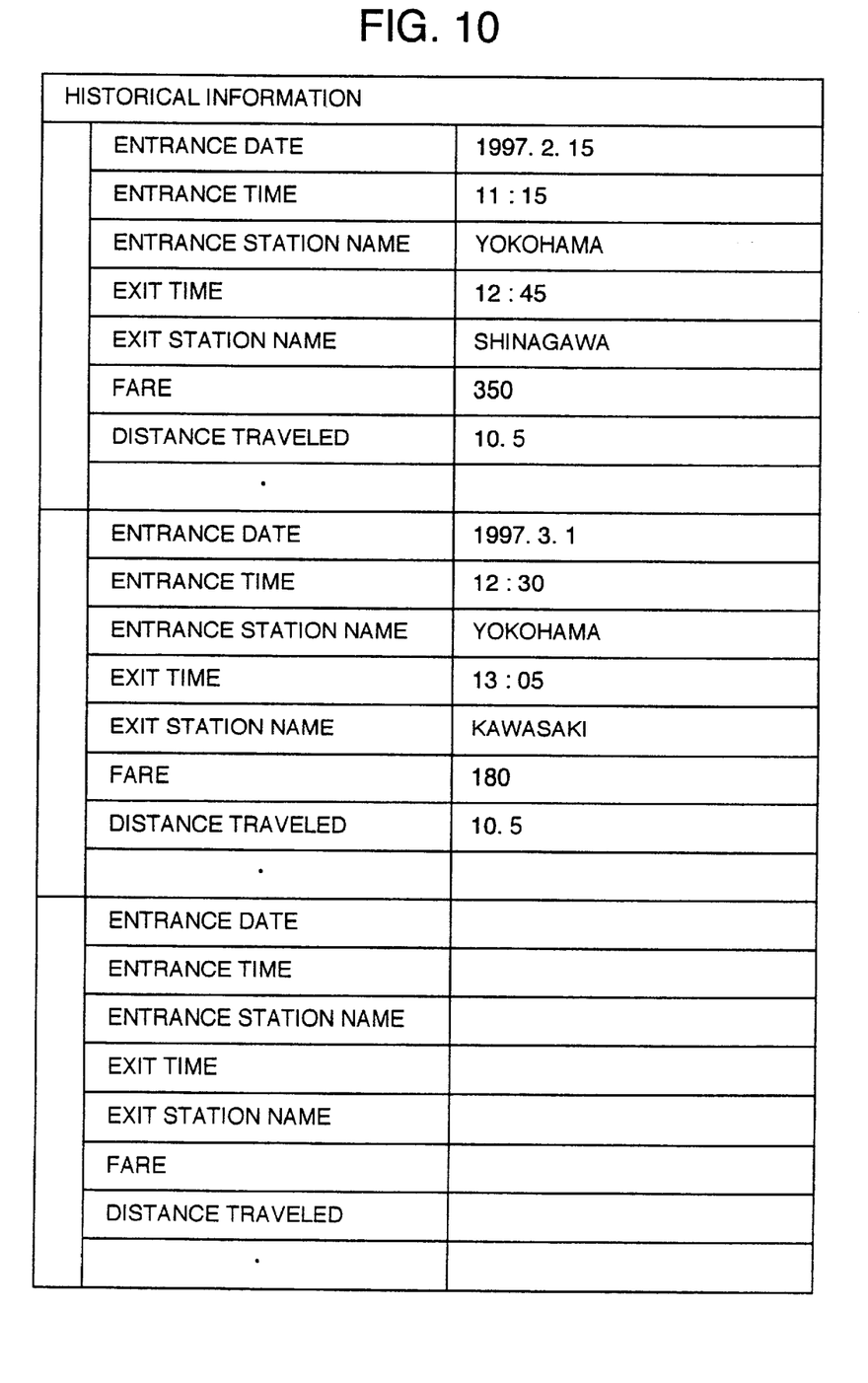
FIG. 10 is a diagram for explaining historical information.

On receiving the exit information 903, the IC card 103 subtracts an amount of the fare indicated by the fare field 901 from a value balance indicated by the stored value balance field 602. The IC card 103 then stores the resultant value as a value balance in the balance field 602. Assume, for example, "2350" is stored in the balance field 602 and "180" is stored in the fare field 903 of the exit information 903. The value of the balance field 602 is accordingly updated to "2170" by subtracting the latter from the former (step 804). After the update of the balance field 602, there is created historical information in accordance with the exit information 903. The historical information is recorded in the historical information table 230 of the EEPROM 205. As shown in FIG. 10, the exit information is adopted as the historical information. Stored in the historical information table 230 is historical (exit) information in a sequence of the entrance date (step 805). Additionally, the IC card 103 calculates accumulated information for the current month in accordance with the exit information and stores the obtained information in the accumulated information table 240. Specifically, the traveled distance 902 of the exit information is added to the accumulated value of traveled distance in the accumulated distance field 1101 corresponding to the current month to be stored as a new accumulated value of traveled distance in the accumulated distance traveled 1101. Similarly, the fare of the exit information is added to the accumulated value of fare in the accumulated fare 1102 corresponding to the current month to be stored as the accumulated value of fare in the accumulated fare field 1102. Furthermore, one is added to the travel count recorded in the accumulated travel count field 1103 (step 806). Subsequently, service points are calculated in accordance with the exit information and the accumulated information kept in the accumulated information table 240. Assume, for example, that the service points are obtained as a sum of the traveled distance and a value attained by multiplying the traveled distance by a percent value represented by one percent of the total of the accumulated distance traveled for the last month and that of the second to last month. Under this condition, when the traveled distance of the exit information 903 is "20" and the total of the accumulated distance traveled for the last month and that of the second last month is "580" as shown in FIG. 4, the service points are calculated as $$20+20\times(580\times0.01)/100=21$$

In the calculation of service points, the personal information kept in the management information table 220 may be used if necessary (step 807). The service points obtained in step 807 are added to the value recorded in the accumulated point area 603. Thereafter, the area 603 is updated to the value resultant from the addition (step 808).

After the accumulated service point area 603 is updated, in accordance with the exit information, the accumulated information kept in the accumulated information table 240, and the personal information stored in the management information table 220, there is calculated the stored value for reduction. Assume, for example, that the fare reduction of 50% applies to children who are five years old or younger. In this case, the date of birth 607 of the personal information 610 is compared with the date of entrance of the exit information 903 to determine the age of the passenger. When the person is under six years old, one half of the fare indicated by the exit information is calculated as the amount of reduction (step 809). Next, a stored value equivalent to the amount of reduction attained in step 809 is added to the value in the stored value balance field 602 and the obtained stored value is stored in the balance field 602 (step 810).

Figure 11:
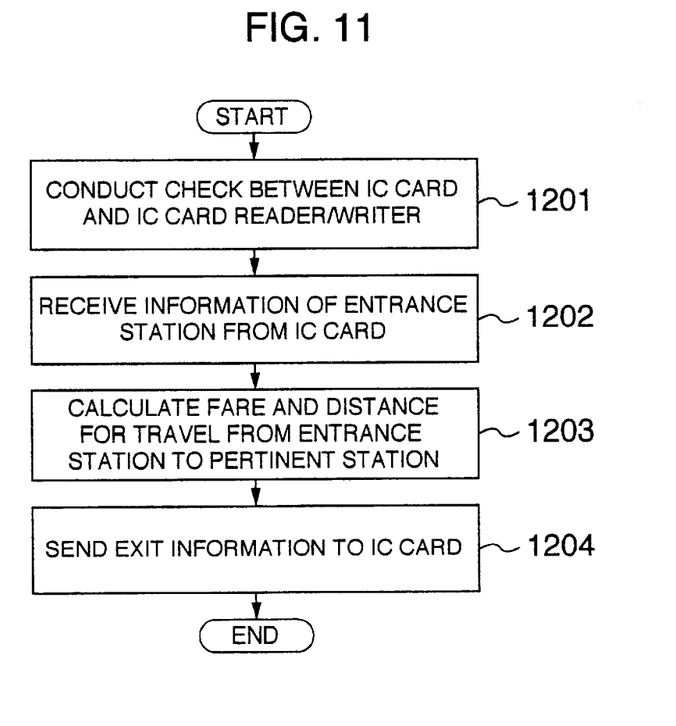
FIG. 11 is a flowchart showing a procedure of processing of the automatic ticket inspection machine when a passenger leaves a platform through the machine.
Figure 12:
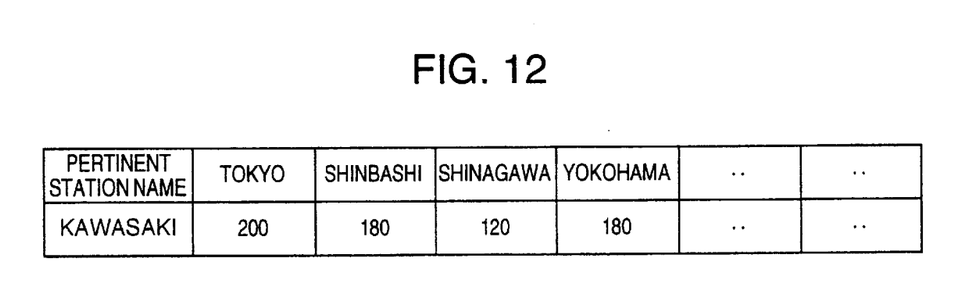
FIG. 12 is a diagram for explaining a fare calculation table of the automatic ticket inspection machine.
Figure 13:
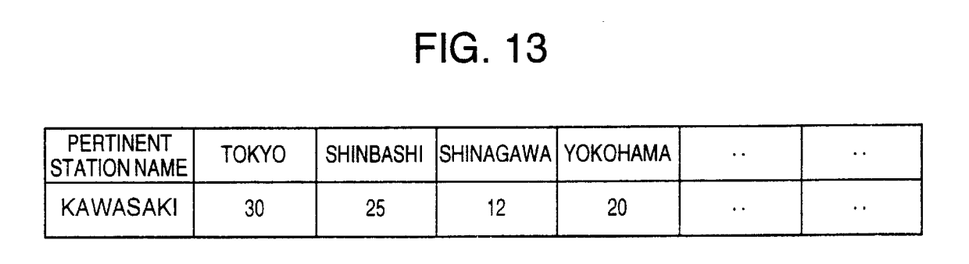
FIG. 13 is a diagram for explaining a distance calculation table of the automatic ticket inspection machine.

FIG. 11 shows, in a flowchart, a procedure of processing in the ticket inspection machine 101, 102 when a passenger leaves a platform therethrough. The wicket controller 302 of the machine 101, 102 establishes communication between the IC card 103, and the IC card reader/writer 301 and then carries out a check therebetween (step 1201). Next, the controller 302 receives the entrance information from the IC card 103 (step 1202). Using the information of entrance station stored in the received entrance information, the controller 302 refers to the fare and distance calculation tables to calculate the distance and the fare between the start station and the pertinent station. Recorded in the fare table are the name of pertinent the station and the fare between the station and each other station, for example, as shown in FIG. 12. Similarly, the distance calculation table includes, for example, the name of the pertinent station and the traveled distance between the station and each other station as shown in FIG. 13 (step 1203). Subsequently, the controller 302 creates exit information in accordance with the entrance information from the IC card 103, the fare and the traveled distance obtained in step 1203, the current time, and the name of pertinent station. The resultant exit information is sent from the reader/writer 301 to the IC card 103 (step 1204).

In conjunction with the embodiment above, description has been given of an example in which service points are assigned in accordance with the traveled distance and the accumulated distance traveled, as well as in accordance with the age of the passenger. However, there may be implemented the following services in accordance with the present invention.

(1) In step 809 of FIG. 8, when the entrance station name and the exit station name match one of the nearest stations included in the personal information, a stored value is calculated for reduction to be added to the stored value balance. This makes it possible to reduce the fare of a particular railway section.

(2) When the age is equal to or more than a particular value in step 809 of FIG. 8, the fare is entirely added to the stored value balance. As a result, any passenger of a particular condition can travel free.

(3) In step 809 of FIG. 8, there is calculated lapsed years relative to the registration date in the personal information so that the increase rate of points is altered in accordance with the obtained lapsed years. For example, 5% is applied for the lapsed time from one year to two years and 10% is applied for the lapsed time equal to or more than two years.

(4) In step 809 of FIG. 8, when the job field indicates "student" in the personal information, the stored value is calculated for reduction and is added to the stored value balance. As a result, there can be achieved a reduction service equivalent to the reduction for students.

In accordance with the embodiment of the present invention as described above, in an IC card possessed by a passenger, there are kept a stored value and the service points corresponding to the traveled distance, the fare, or the like. When the passenger enters or leaves the platform through an automatic ticket inspection machine installed at a wicket of each station, the fare is subtracted from the stored value for the fare adjustment. Moreover, when the passenger enters or leaves the platform through an automatic ticket inspection machine, there is received information to calculate service points such that the service points are accumulated to be stored in the IC card. Thanks to the provision of the service processing system of the embodiment, the service points can be calculated and managed by the IC card without using the host system. Additionally, there can be accomplished a more precise point service in accordance with the passenger or customer and the utilization state thereof without utilizing the host system. The embodiment has been described as an example of the present invention. It is to be appreciated that the invention is not restricted by the embodiment.

While the present invention has been described with reference to the particular illustrative embodiment, it is not to be restricted by the embodiment but only by the appended claims. It is to be appreciated that those skilled in the art can change or modify the embodiment without departing from the scope and spirit of the present invention.

What is claimed is:

1. A method for determining a fare for utilization of a traffic facility in a utilization fare system including a ticket inspection machine installed at the traffic facility and an IC card for transferring information to and receiving information from said ticket inspection machine, said IC card executing the following steps:

previously storing birthday information relating to a birthday of a user, balance information which is changed in accordance with the utilization fare of said traffic facility, and information representative of a reduction rate which is applied to the utilization fare of said traffic facility which is determined in accordance with an elapsed time beginning at said user's birthday, in said IC card information;

storing entrance station identification information received from a ticket inspection machine installed at an entrance station utilized by said user and date information representative of a date on which said user utilizes said traffic facility, in said IC card;

transferring said entrance station identification information to a ticket inspection machine installed at an exit station utilized by said user;

receiving fare information representative of the utilization fare of said traffic facility determined in accordance with said transferred entrance station identification information;

calculating a period between said birthday information and said date information;

adjusting said balance information based on said period, said reduction rate, and said fare information.

2. A method according to claim 1, wherein said adjusting step includes the steps of:

subtracting said fare information from said balance information;

referring to said reduction rate corresponding to said period;

calculating a reduced fare on the basis of said reduction rate and said fare information; and adding an equivalent of said reduced fare to said subtracted balance information.

3. A processing system for determining a fare for utilization of a traffic facility, comprising:

means for storing, in an IC card, entrance station identification information received from a ticket inspection machine installed at an entrance station utilized by a user and date information representative of a date on which said user utilizes said traffic facility;

means for transferring said entrance station identification information to a ticket inspection machine installed at an exit station utilized by said user;

means for receiving fare information representative of the utilization fare of said traffic facility determined in accordance with said transferred entrance station identification information; and means for adjusting balance information stored in said IC card based on a user's birthday information stored in said IC card, said date information, a reduction rate stored in said IC card, and said fare information.

4. A processing system according to claim 3, wherein said means for adjusting balance information subtracts said fare information from balance information stored in said IC card, calculates a period between the user's birthday information stored in said IC card and said date information, calculates a reduced fare on the basis of said reduction rate and said fare information, and adds an equivalent of said reduced fare to said subtracted balance information.

5. A processing system according to claim 4, further comprising said IC card, wherein said means for adjusting balance information is on said IC card.

6. A process system according to claim 5, wherein said reduction rate is based on an elapsed period between the user's birthday and the date of utilization in said date information.

7. A processing system according to claim 6, wherein said reduction rate is stored in said IC card, and said IC card refers to the stored reduction rate to calculate the reduced fare.

8. A processing system according to claim 3, further comprising said IC card, wherein said means for adjusting balance information is on said IC card.

9. A processing system according to claim 8, wherein said reduction rate is based on an elapsed period between the user's birthday and the date of utilization in said date information.

10. A processing system according to claim 9, wherein said IC card refers to the stored reduction rate to calculate the reduced fare.

* * * * *